United States Patent [19]

Shelby et al.

[11] 4,205,739
[45] Jun. 3, 1980

[54] METERING DEVICE FOR STEERING BRAKE LUBE SYSTEMS

[75] Inventors: Robert L. Shelby, Chillicothe; Gerald E. Whitehurst, East Peoria; Arthur J. Ritter, Metamora, all of Ill.

[73] Assignee: Caterpillar Tractor Co., Peoria, Ill.

[21] Appl. No.: 892,151

[22] Filed: Mar. 31, 1978

Related U.S. Application Data

[63] Continuation of Ser. No. 721,653, Sep. 8, 1976, abandoned.

[51] Int. Cl.² ............................................. F16D 13/72
[52] U.S. Cl. ................................................. 192/113 B
[58] Field of Search ............. 192/113 B, 113 R, 70.12

[56] References Cited

U.S. PATENT DOCUMENTS

| | | | |
|---|---|---|---|
| 3,059,746 | 10/1962 | Christenson | 192/113 B |
| 3,080,774 | 3/1963 | Nickerson et al. | 192/113 B |
| 3,105,582 | 10/1963 | Ziabicki | 192/113 B |
| 3,292,758 | 12/1966 | Polack | 192/113 B |
| 3,823,802 | 7/1974 | Winzeler et al. | 192/113 B |
| 3,834,503 | 9/1974 | Maurer et al. | 192/113 B |
| 3,913,616 | 10/1975 | Horsch | 192/113 B |

*Primary Examiner*—George H. Krizmanich
*Attorney, Agent, or Firm*—Wegner, Stellman, McCord, Wiles & Wood

[57] ABSTRACT

A lubricating system for use in a rotative drive assembly including a clutch pack and a brake pack. The system is arranged to utilize a movement of the piston actuator of the clutch and/or brake pack for controlling delivery of the lubricating oil thereto. The system may be arranged to provide a minimum delivery of lubricating oil to the clutch pack and/or brake pack at all times.

10 Claims, 6 Drawing Figures

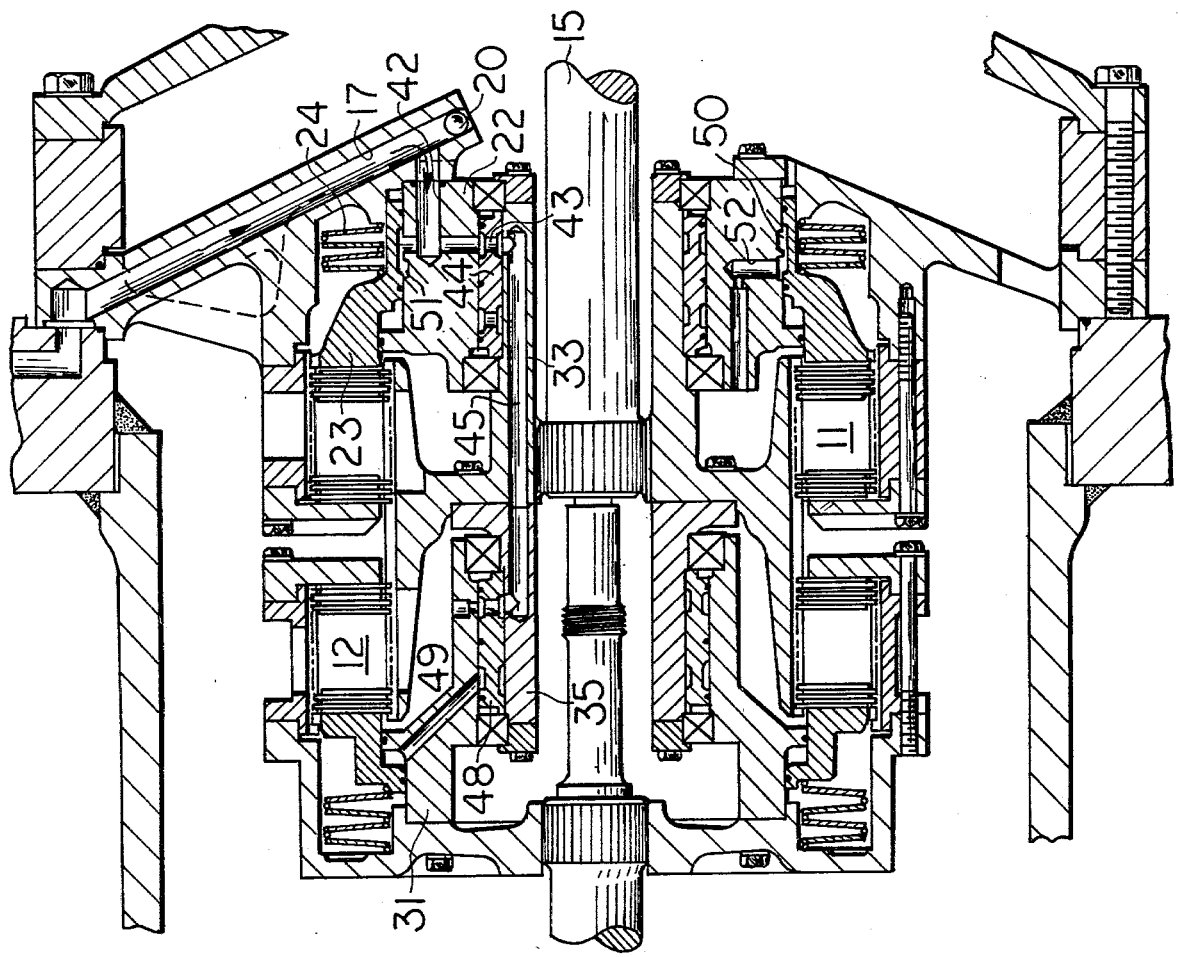
FIG_5

METERING DEVICE FOR STEERING BRAKE LUBE SYSTEMS

This ia s continuation of application Ser. No. 721,653 filed Sept. 8, 1976, abandoned.

BACKGROUND OF THE INVENTION

1. Field of the Invention

This invention relates to rotary drive assemblies and in particular to means for lubricating such assemblies having clutch and brake packs.

2. Description of the Prior Art

In one form of rotative drive assembly, a brake pack and a clutch pack are provided for controlling the delivery of driving power to a final drive, such as the final drive of the wheel or track-type vehicle. In such drive assemblies, lubricating oil is provided to the clutch pack or brakes for both cooling and lubricating the plates thereof when engaged. The clutch and brake packs may be selectively operated to effect a steering operation as by controlling the driving and braking of opposite sides of the vehicle propulsion means.

One excellent example of such a drive assembly is shown in copending U.S. patent application, Ser. No. 696,680, of Gerald E. Whitehurst, for a Modular Steering Clutch and Brake Pack, filed June 16, 1976, which application is owned by the assignee hereof, and which has issued on June 27, 1978, as U.S. Pat. No. 4,096,931.

A number of different prior art United States Letters Patent disclose means for cooling clutches and the like in such rotative drive assemblies. Illustratively, in U.S. Pat. No. 3,351,169, of Ronald M. McIndoe, a control system for hydraulically actuated friction clutches is disclosed wherein a cooling flow of lubricant is delivered to the clutch disks during partial engagement but not during disengagement thereof. A manual clutch pedal is connected through a linkage to suitable valve means of a hydraulically actuated clutch control to control the supply of fluid to the friction surfaces. The valve means includes a first portion defining a pressure regulator for modulating the pressure of and controlling the flow of clutch-engaging fluid, and a second portion for controlling the flow of clutch cooling fluid. The modulation of the valve permits the operator to obtain a desired degree of clutch engagement. The system utilizes a relatively sophisticated external valving means for effecting the desired control.

Another example of hydrodynamic and friction coupling is shown in U.S. Pat. No. 3,547,235 of Hellmut Weinrich. As disclosed therein, oil circulation is effected during a braking operation to bring about a cooling of the braking discs. In effect, a fottinger circuit is formed.

U.S. Pat. No. 3,773,157 of Franklin O. Koch, Jr. et al, discloses a clutch with coolant cut-off valve arranged to divert fluid from the friction means during disengagement thereof to eliminate viscous drag. Upon disengagement of the clutch assembly therein, a housing is moved while the valve is held in position by means of a control rod. Movement of the housing opens flow passages for providing free flow of fluid from the pressure chamber directly to the sump to provide a sharp cut-off of fluid supply to the clutch disc assembly. The result is that the space between the discs is free of oil, thereby eliminating this viscous drag. A separate diverter valve is provided in a cylindrical bore of the structure to provide the desired control.

SUMMARY OF THE INVENTION

The present invention comprehends an improved rotative drive assembly having means for conducting lubricant oil from a pressurized source to a clutch pack and brake pack means thereof including control means for selectively controlling the delivery of the lubricating oil therethrough as an incident of movement of he means for operating the clutch pack and/or brake pack.

More specifically, the clutch pack and brake pack are operated by piston means associated respectively therewith whereby movement of the piston means is utilized for effecting the desired control of the delivery of lubricating oil to the clutch and/or brake pack.

The control means may be arranged to provide selectively to the clutch pack a large flow of lubricant for concurrently cooling and lubricating the clutch pack when engaged, and a small flow for only lubricating the clutch pack when disengaged.

The control means may further comprise means for providing selectively to the brake pack a large flow for concurrently cooling and lubricating the brake pack when engaged, and a small flow for only lubricating the brake pack when disengaged.

A carrier may be provided extending between the brake pack and clutch pack and may define passage means forming a portion of the flow conducting means.

In the illustrated embodiment, the brake piston means includes a brake piston and a retainer movably carrying the brake piston with the lubricant conducting means comprising passage means extending through the retainer and passage means extending through the brake piston selectively communicable with the retainer passage means.

In the illustrated embodiment, the clutch piston means may include a clutch piston and a retainer movably carrying the clutch piston with the conducting means comprising passage means through the clutch piston retainer and with the passage means extending through the clutch piston being selectively communicable with the clutch retainer passage means.

The control means may direct at least a preselected minimum flow of lubricant to the clutch pack and/or brake pack at all times during rotation of the drive assembly.

The flow conducting means may include flow restricting means for restricting lubricating oil flow to the brake pack when the brake is not actuated.

The conducting means may include means for directing a major portion of the lubricant oil flow away from the clutch pack when the clutch pack is not engaged.

Thus, the drive assembly structure of the present invention is extremely simple and economical of construction while yet providing the highly desirable features as discussed above.

BRIEF DESCRIPTION OF THE DRAWING

Other features and advantages of the invention will be apparent from the following description taken in connection with the accompanying drawing wherein:

FIG. 5 is a fragmentary diametric section of the assembly with the brake engaged and FIG. 6 is a fragmentary diametric section of the assembly illustrating the flow of coolant lubricant to the clutch and brake during operation of the drive assembly.

DESCRIPTION OF THE PREFERRED EMBODIMENT

Figure 1:
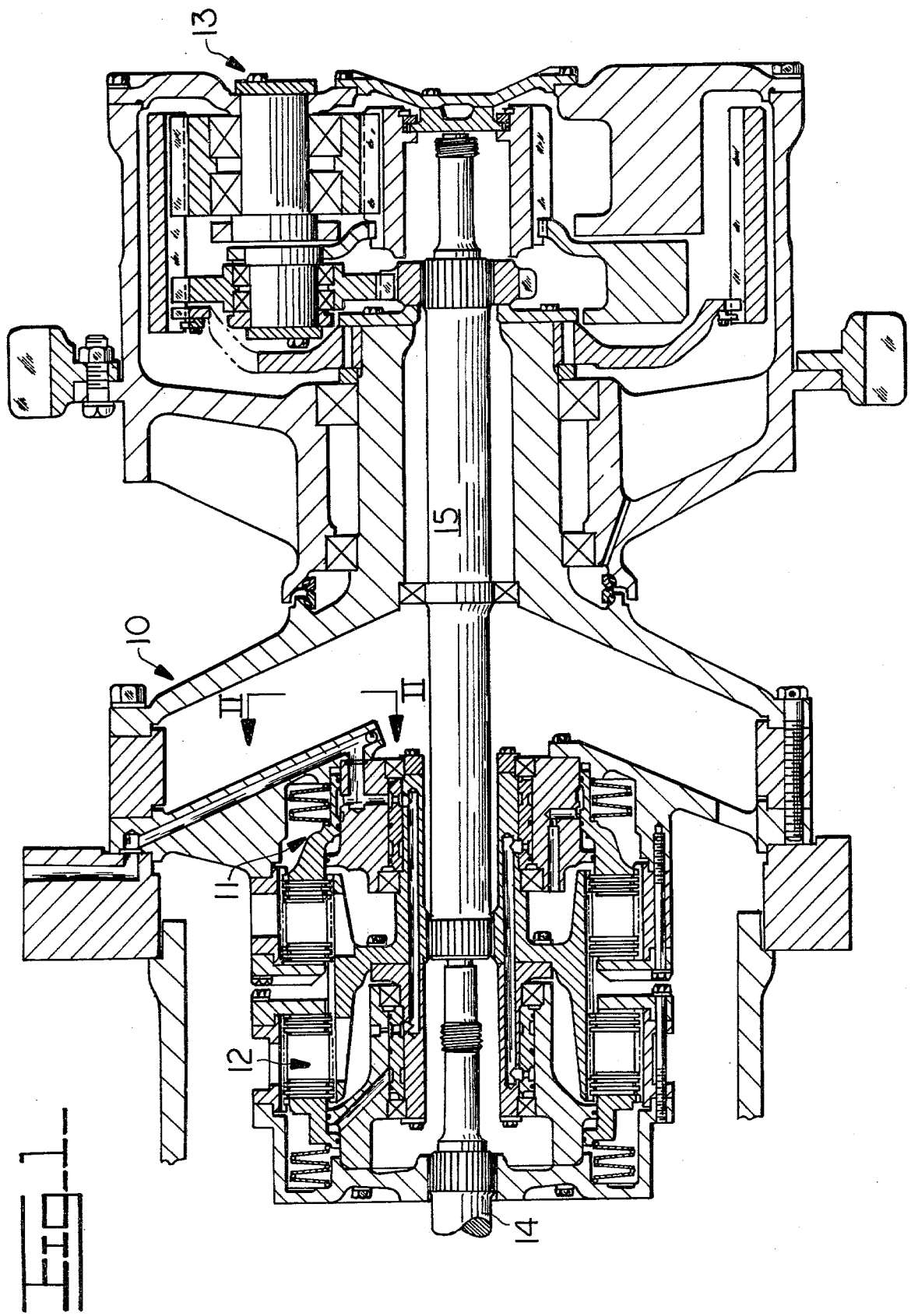
FIG. 1 is a fragmentary diametric section of a rotative drive assembly having improved lubricating and cooling means embodying the invention.

In the exemplary embodiment of the invention as disclosed in the drawing, a rotative drive assembly generally designated 10 is shown to comprise a brake pack generally designated 11, a clutch pack generally designated 12, and a final drive generally designated 13. An input drive shaft 14 is selectively connected to the final drive shaft 15 through the drive assembly so as to provide a steering brake control of a vehicle (not shown) in which the drive assembly is provided.

The present invention is concerned with the problem of providing cooling and lubrication of the brake and clutch packs and comprehends an improved means for effecting the same.

Figure 4:
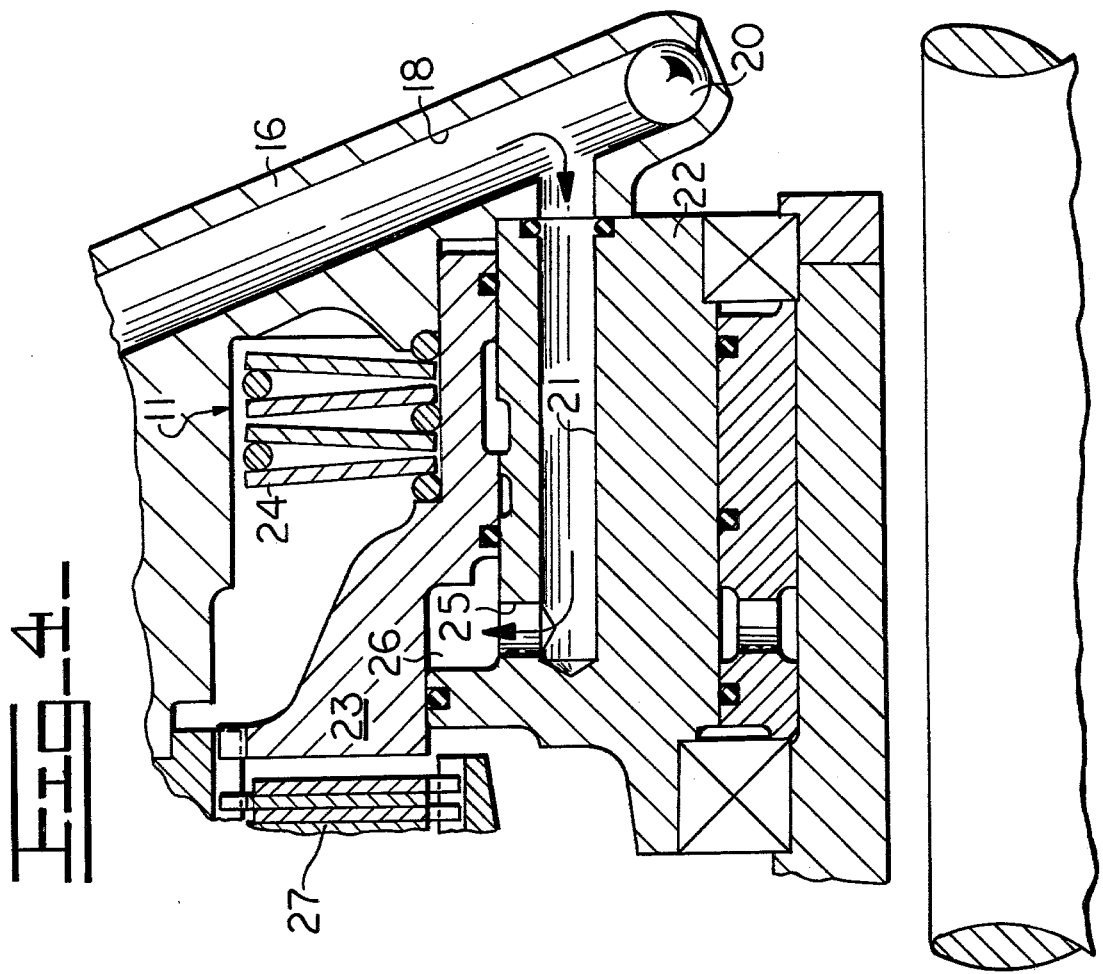
FIG. 4 is a fragmentary enlarged diametric section of the assembly with the brake released.
Figure 2:
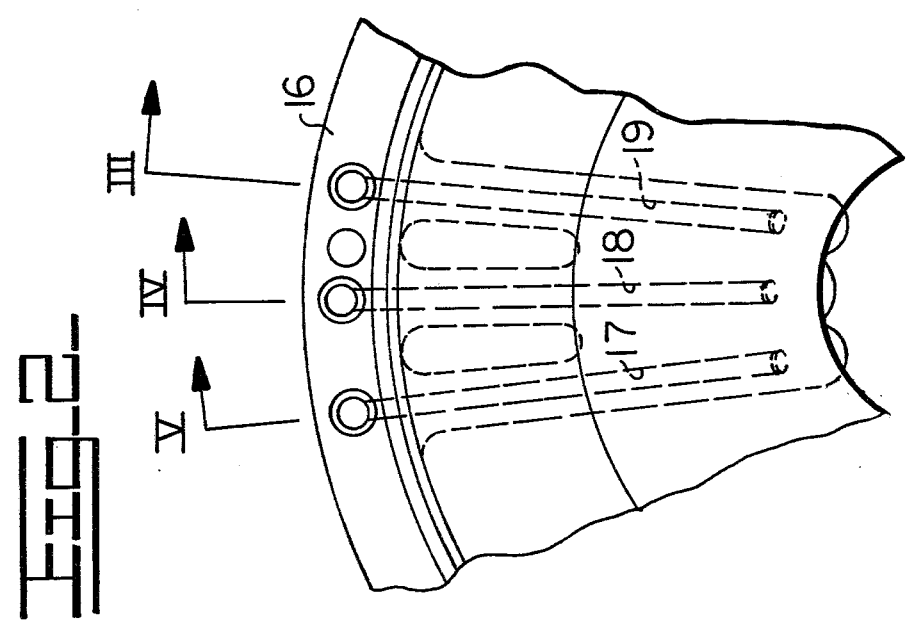
FIG. 2 is a fragmentary sectional view taken substantially along the line 2—2 of FIG. 1.

More specifically, as shown in FIG. 4, brake pack 11 includes an outer housing 16. As illustrated in FIG. 2, the housing 16 is provided with three lubricating oil delivery passages 17, 18 and 19. Each of these passages is connected to a suitable source (not shown) of pressurized coolant lubricating oil suitable to cool and lubricate the brake and clutch packs, respectively. Each of the flow passages is closed at its lower end by a suitable check valve 20, as illustrated in FIG. 4 in connection with flow passage 18. Flow passage 18 communicates with a passage 21 provided in a retainer 22 slidably carrying a brake piston 23 of the brake pack 11. Piston 23 is biased by a Belleville spring 24 compressed between the brake housing 16 and the piston 23.

Passage 21 in retainer 22 is provided with an outlet 25 opening to a chamber 26 inwardly of the piston 23 so that when pressurized oil is delivered therethrough to chamber 26, the bias of spring 24 is overcome so as to release the friction brake 27.

Figure 3:
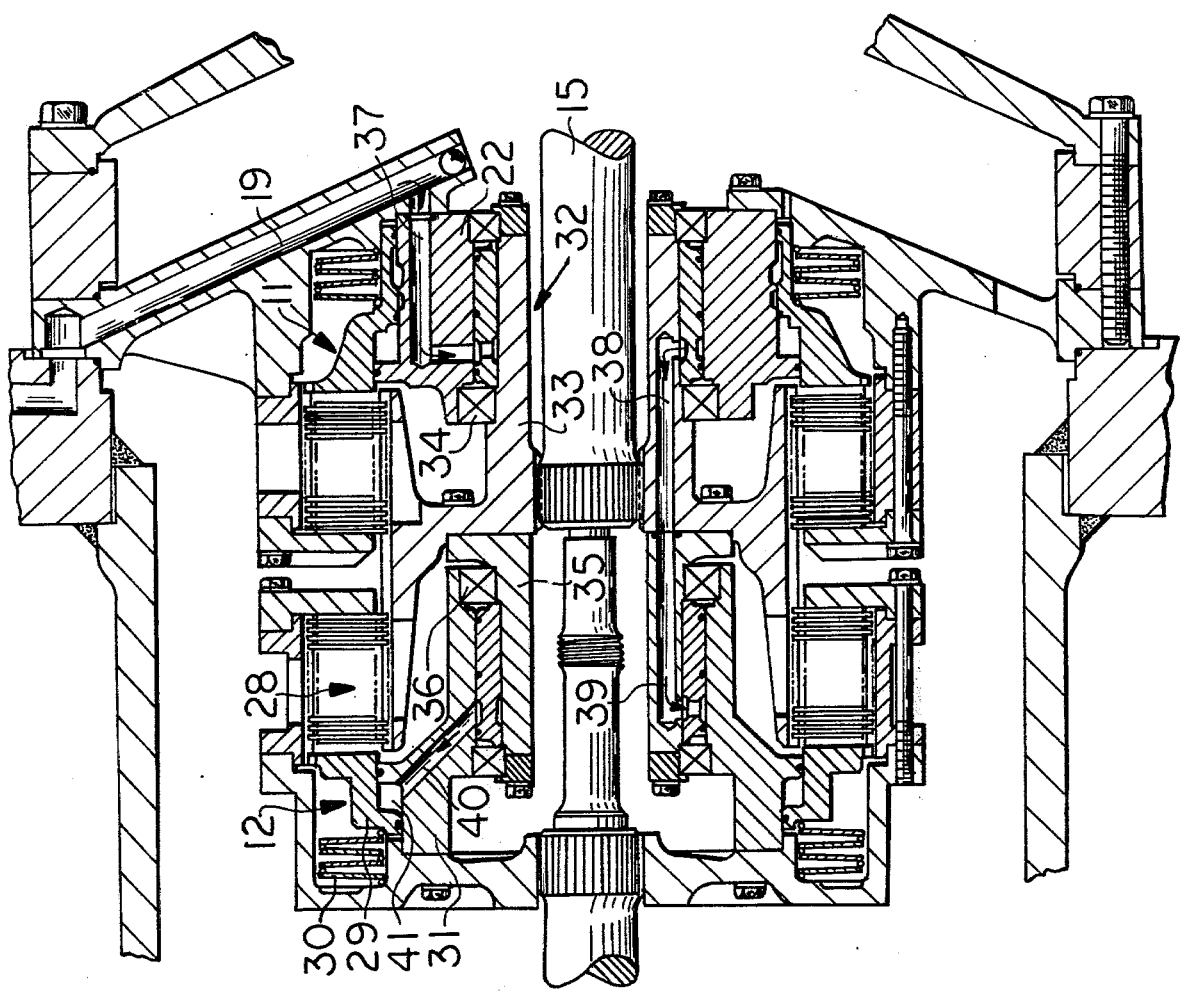
FIG. 3 is a fragmentary diametric section of the assembly with the clutch released.

Similarly, as shown in FIG. 3, the clutch 28 of clutch pack 12 is operated by a clutch piston 29 under the biasing action of a Belleville spring 30. Piston 29 is carried on a retainer 31.

As further shown in FIG. 3, extending between brake pack 11 and clutch pack 12 is a two-piece carrier generally designated 32 having a first portion 33 splined to the drive shaft 15 and to the clutch 28. Carrier portion 33 is provided with a first bearing 34 for inwardly journaling the brake piston retainer 22. A second portion 35 of the carrier is provided with a bearing 36 for inwardly journaling the retainer 31 of the clutch pack.

As shown in FIG. 3, brake piston retainer 22 is provided with a passage 37 which opens to a passage 38 in carrier portion 33 for conducting pressurized oil from brake housing passage 19. Carrier passage 38 communicates with a passage 39 in carrier portion 35, which, in turn, communicates with a passage 40 in clutch piston retainer 31 to provide pressurized oil to chamber 41 of the clutch pack for urging the clutch piston 29 to the left, as seen in FIG. 3, against the bias of spring 30 and thereby disengaging the clutch 28.

Thus, by suitably controlling the delivery of pressurized fluid to the chambers 26 and 41 of the brake pack and clutch pack, respectively, from the delivery passages 18 and 19, respectively, selective operation of the brake and clutch may be effected in the rotative drive assembly 10.

Cooling lubricant oil is delivered to the brake and clutch packs from the delivery passage 17, as shown in FIG. 2. As further shown in FIG. 6, the coolant lubricant is delivered from passage 17 to a passage 42 in brake piston retainer 22 and from passage 42 to a passage 43 in an annular sleeve 44 extending concentrically about carrier portion 33.

The coolant lubricant is delivered from passage 43 to a passage 45 in carrier portion 33, a passage 46 in carrier portion 35 communicating with passage 45, a passage 47 in a sleeve 48 extending concentrically about carrier portion 35, and a passage 49 in clutch piston retainer 31 to the clutch pack 12.

Figure 6:
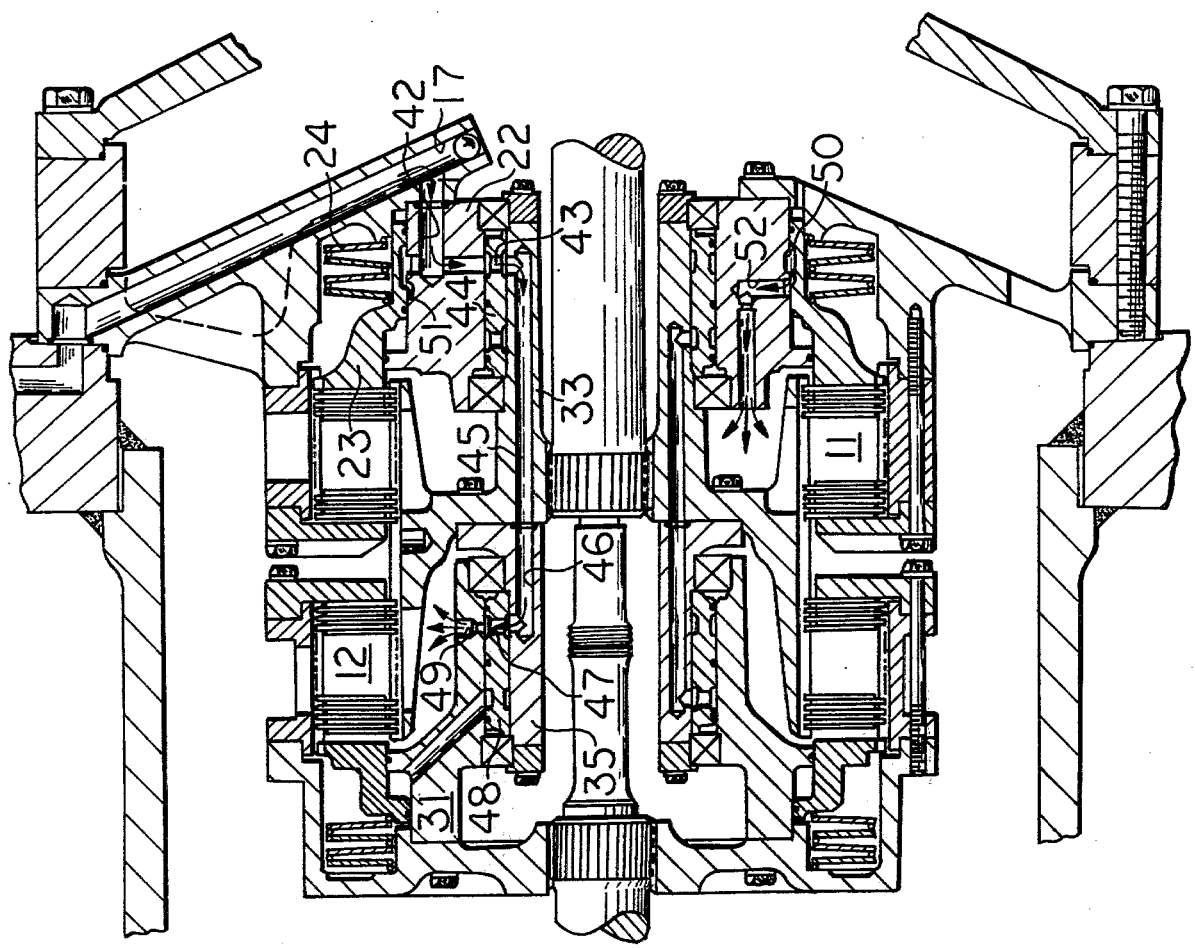

As further shown in FIG. 5, the coolant lubricant is delivered from passage 42 to an annular recess 50 in piston 23. Depending on the disposition of piston 23, recess 50 may be in selective communication with an annular recess 51 in brake piston retainer 22, which is in communication with a passage 52 extending through the retainer 22 for delivering the coolant lubricant to the brake pack 11. More specifically, when the brake piston is urged to the right against the biasing action of spring 24 by the delivery of pressurized fluid to chamber 26, as shown in FIG. 4, piston recess 50 is displaced to the right sufficiently to provide only limited delivery of coolant lubricant to the recess 51 and thereby provide a limited delivery of lubricant to the brake pack. When the brake is applied by the removal of pressure from chamber 26, the piston 23 moves to the left as seen in FIG. 5, to place the recess 51 in full communication with the piston recess 50, thereby permitting a relatively unrestricted flow of coolant lubricant to the brake pack and thereby decreasing the delivery of coolant lubricant from passage 42 to the clutch pack, while yet maintaining a continued small delivery of lubricant thereto. When the brake is engaged, coolant flow to the clutch is decreased because coolant flow through 51 and 52 to the brake causes a pressure drop in coolant passages 45, 46 and 49 to the clutch. However, as shown in FIGS. 5 and 6, there is always some coolant flow to the clutch via passages 17, 43, 45, 46, 47 and 49, and this flow is effectively not varied by operation of the clutch.

Thus, the selective movement of the brake piston 23 automatically controls the delivery of the coolant lubricant to both the brake pack and clutch pack so as to provide in the drive assembly 10 a large volume delivery of the coolant lubricant to the clutch pack when the clutch is engaged and to the brake pack when the brake is actuated. When the brake is engaged, the coolant flow to the brake pack is increased and the coolant flow to the clutch pack is concurrently automatically decreased. When the brake is released, coolant flow to the brake pack is decreased, and coolant flow to the clutch pack is increased. Operation and movement of the clutch piston does not effectively vary the coolant flow to either the clutch pack or brake pack.

Thus, the present invention eliminates the need for costly valves and the like and utilizes the elements of the rotative drum assembly in a novel and simple manner to provide the highly desirable improved lubricant flow control.

The passages in the different elements of the drive assembly providing the lubricant flow paths discussed above may be provided by simple drilling operations and, thus, the improved lubricant control system is extremely simple and economical of construction.

The foregoing disclosure of specific embodiments is illustrative of the broad inventive concepts comprehended by the invention.

We claim:

1. In a rotative drive assembly having a clutch pack provided with a selectively movable clutch piston means for selectively engaging the clutch, a brake pack provided with a selectively movable brake piston means for selectively actuating the brake, and a source of pressurized lubricating oil, the improvement comprising conducting means for conducting lubricant oil from the source to said clutch pack and brake pack including flow control means for selectively causing concurrent delivery of the lubricating oil therethrough to the clutch pack and brake pack with the delivery to the clutch pack being controlled automatically as an incident of movement of the piston of the brake pack, said conducting means being arranged to provide selectively to the brake pack a large flow of said oil for concurrently cooling and lubricating the brake pack when the brake is actuated and a decreased flow for lubricating the brake pack when the brake is not actuated, said conducting means substantially reducing the flow of said oil to said clutch pack solely by diverting a substantial portion of the flow from the clutch pack to the brake pack as a result of the actuation of said brake pack.

2. The drive assembly of claim 1 wherein said conducting means includes pressure drop means arranged to provide selectively to the clutch pack a large flow for concurrently cooling and lubricating the clutch pack when actuated and the brake pack is not actuated and a decreased flow for only lubricating the clutch pack when the brake pack is actuated.

3. The drive assembly of claim 1 further including a carrier extending between said brake pack and clutch pack and provided with passage means forming a portion of said conducting means.

4. The drive assembly of claim 1 wherein said brake piston means includes a brake piston and a retainer movably carrying the brake piston, said conducting means comprising passage means through said retainer and passage means through said brake piston selectively communicable with said retainer passage means.

5. The drive assembly of claim 1 wherein said clutch piston means includes a clutch piston and a retainer movably carrying the clutch piston, and said conducting means comprises passage means through said retainer.

6. The drive assembly of claim 1 wherein said control means comprises means for directing at least a preselected minimum flow of lubricant to the clutch pack and brake pack at all times during rotation of the drive assembly.

7. The drive assembly of claim 1 wherein said conducting means include flow restricting means for restricting lubricating oil flow to the brake pack when the brake is not actuated and thereby increasing the pressure of the oil being concurrently delivered to the clutch pack.

8. The drive assembly of claim 1 wherein said conducting means comprises means for directing a major portion of the lubricant oil flow away from the clutch pack when the clutch is not engaged and the brake is engaged.

9. The drive assembly of claim 1 wherein said conducting means comprises means for direction a major portion of the total lubricant oil flow from said source to the brake pack for cooling and lubrication of the brake pack upon actuation of the brake.

10. In a rotative drive assembly having a clutch pack provided with a selectively movable clutch piston means for selectively engaging the clutch, a brake pack provided with a selectively movable brake piston means for selectively actuating the brake, and a source of pressurized lubricating oil, the improvement comprising:

conducting means for conducting lubricant oil from the source to said clutch pack and brake pack including control means for selectively controlling the delivery of the lubricating oil therethrough as an incident of movement of the brake piston means, said conducting means being arranged to provide selectively to the brake pack a large flow of said oil for concurrently cooling and lubricating the brake pack when the brake is actuated and a decreased flow for only lubricating the brake pack when the brake is not actuated, said conducting means further controlling the flow of said oil to said clutch pack as a function of the flow to said brake pack; and a carrier extending between said brake pack and clutch pack provided with passage means forming a portion of said conducting means, said clutch piston means including a clutch piston and a retainer movably carrying the clutch piston, said conducting means comprising passage means through said retainer communicating with said carrier passage means, and chamber means in said clutch piston in communication with said retainer passage means.

* * * * *